United States Patent
Larkin et al.

(10) Patent No.: US 6,843,350 B2
(45) Date of Patent: *Jan. 18, 2005

(54) METHOD AND APPARATUS FOR MOUNTING A BRAKE DISC WITH RESILIENT BIASING MEANS

(75) Inventors: James Anthony Larkin, Rugby (GB); William Anthony Thorpe, Burbage (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/019,919

(22) PCT Filed: Apr. 17, 2001

(86) PCT No.: PCT/GB01/01958

§ 371 (c)(1),
(2), (4) Date: Apr. 9, 2002

(87) PCT Pub. No.: WO01/86167

PCT Pub. Date: Nov. 15, 2001

(65) Prior Publication Data

US 2003/0006108 A1 Jan. 9, 2003

(30) Foreign Application Priority Data

May 5, 2000 (GB) .............................................. 0010810

(51) Int. Cl.⁷ .............................................. F16D 65/10
(52) U.S. Cl. ................................. 188/218 XL; 188/73.2; 188/73.38
(58) Field of Search .......................... 188/218 XL, 73.2, 188/73.38, 73.31, 73.36, 73.37, 73.1, 71.1; 192/207, 210.1, 70.19, 200

(56) References Cited

U.S. PATENT DOCUMENTS

| 2,724,252 A | 11/1955 | Schmal |
| 2,737,033 A | 3/1956 | Bendall |

(List continued on next page.)

FOREIGN PATENT DOCUMENTS

| DE | 1205345 | 11/1965 |
| DE | 2039003 | 2/1971 |
| DE | 3740373 | 6/1988 |
| EP | 0096553 | 12/1983 |
| GB | 662071 | 11/1951 |

(List continued on next page.)

*Primary Examiner*—Matthew C. Graham
*Assistant Examiner*—Mariano Sy
(74) *Attorney, Agent, or Firm*—Michael D. Smith

(57) ABSTRACT

A disc brake system of the kind comprising an axially fixed hub and at least one slideable brake disc comprises a resilient device acting between the disc and the hub to control certain aspects of the movement of the brake disc during use. Despite the thermal differential arising in use between the brake disc and the central hub due to the localized heat generation of the brake system and the mass and thermal capacity differences between the hub and the brake disc, whereby the hub would be expected to provide a more satisfactory mounting, the resilient device acting between the disc and the hub to control the disc dynamics is mounted on the disc.

14 Claims, 9 Drawing Sheets

U.S. PATENT DOCUMENTS

| | | | | |
|---|---|---|---|---|
| 2,764,261 A | | 9/1956 | Bridges | |
| 3,146,860 A | | 9/1964 | Wilson | |
| 3,191,735 A | | 6/1965 | Warvak | |
| 3,233,704 A | | 2/1966 | Strain et al. | |
| 3,642,101 A | | 2/1972 | Hauth | |
| 3,754,624 A | * | 8/1973 | Eldred | 188/71.5 |
| 3,837,420 A | | 9/1974 | Kobeit | |
| 3,844,385 A | | 10/1974 | Szekely | |
| 3,861,501 A | | 1/1975 | Brooks et al. | |
| 3,915,272 A | | 10/1975 | Maurice | |
| 4,043,437 A | * | 8/1977 | Taylor | 188/218 XL |
| 4,256,209 A | | 3/1981 | Lupertz | |
| 4,318,306 A | | 3/1982 | Fischer | |
| 4,479,569 A | | 10/1984 | Kummer et al. | |
| 4,534,457 A | | 8/1985 | Eltze et al. | |
| 4,576,255 A | | 3/1986 | Mery et al. | |
| 4,673,065 A | | 6/1987 | Gerard et al. | |
| 4,699,254 A | | 10/1987 | Mery | |
| 4,844,206 A | | 7/1989 | Casey | |
| 4,863,000 A | | 9/1989 | Patel | |
| 4,865,160 A | | 9/1989 | Casey | |
| 5,005,676 A | | 4/1991 | Gassiat | |
| 5,358,079 A | | 10/1994 | Brown | |
| 5,383,538 A | * | 1/1995 | Bair et al. | 188/218 R |
| 5,402,865 A | | 4/1995 | Harker | |
| 5,674,026 A | | 10/1997 | Ishibashi et al. | |
| 6,056,089 A | | 5/2000 | Karlsson et al. | |
| 6,131,932 A | | 10/2000 | Bunker | |
| 6,223,863 B1 | | 5/2001 | Bunker | |
| 6,244,391 B1 | | 6/2001 | Bunker | |
| 6,247,560 B1 | | 6/2001 | Bunker | |
| 6,298,953 B1 | | 10/2001 | Bunker | |
| 6,305,510 B1 | * | 10/2001 | Bunker | 188/218 XL |
| 6,457,567 B1 | * | 10/2002 | Bunker | 188/18 A |
| 6,511,135 B2 | | 1/2003 | Ballinger et al. | |
| 6,626,272 B2 | | 9/2003 | Frouin | |

FOREIGN PATENT DOCUMENTS

| | | |
|---|---|---|
| GB | 949018 | 2/1964 |
| GB | 1091693 | 11/1967 |
| GB | 1139699 | 1/1969 |
| GB | 1350350 | 4/1974 |
| GB | 1396503 | 6/1975 |
| GB | 1530461 | 11/1978 |
| GB | 2015122 | 9/1979 |
| GB | 2031538 | 4/1980 |
| GB | 2150263 | 6/1985 |
| GB | 2164712 | 3/1986 |
| GB | 2184801 | 7/1987 |
| GB | 2320299 | 6/1998 |
| GB | 2320300 | 6/1998 |
| GB | 2320301 | 6/1998 |
| GB | 2340561 | 2/2000 |
| GB | 2340562 | 2/2000 |
| GB | 2340563 | 2/2000 |
| GB | 2340564 | 2/2000 |
| GB | 2346940 | 8/2000 |
| GB | 2361973 | 11/2001 |
| WO | 89/05924 | 6/1989 |
| WO | 97/20150 | 6/1997 |
| WO | 98/25804 | 12/1997 |
| WO | 98/26192 | 12/1997 |
| WO | 98/26191 | 6/1998 |
| WO | 00/09900 | 2/2000 |
| WO | 00/09903 | 2/2000 |
| WO | 00/09904 | 2/2000 |
| WO | 00/09905 | 2/2000 |
| WO | 00/09909 | 2/2000 |
| WO | 00/09911 | 2/2000 |
| WO | 00/42332 | 7/2000 |
| WO | 01/03295 | 1/2001 |
| WO | 01/33096 | 5/2001 |
| WO | 01/40671 | 6/2001 |
| WO | 01/86165 | 11/2001 |

* cited by examiner

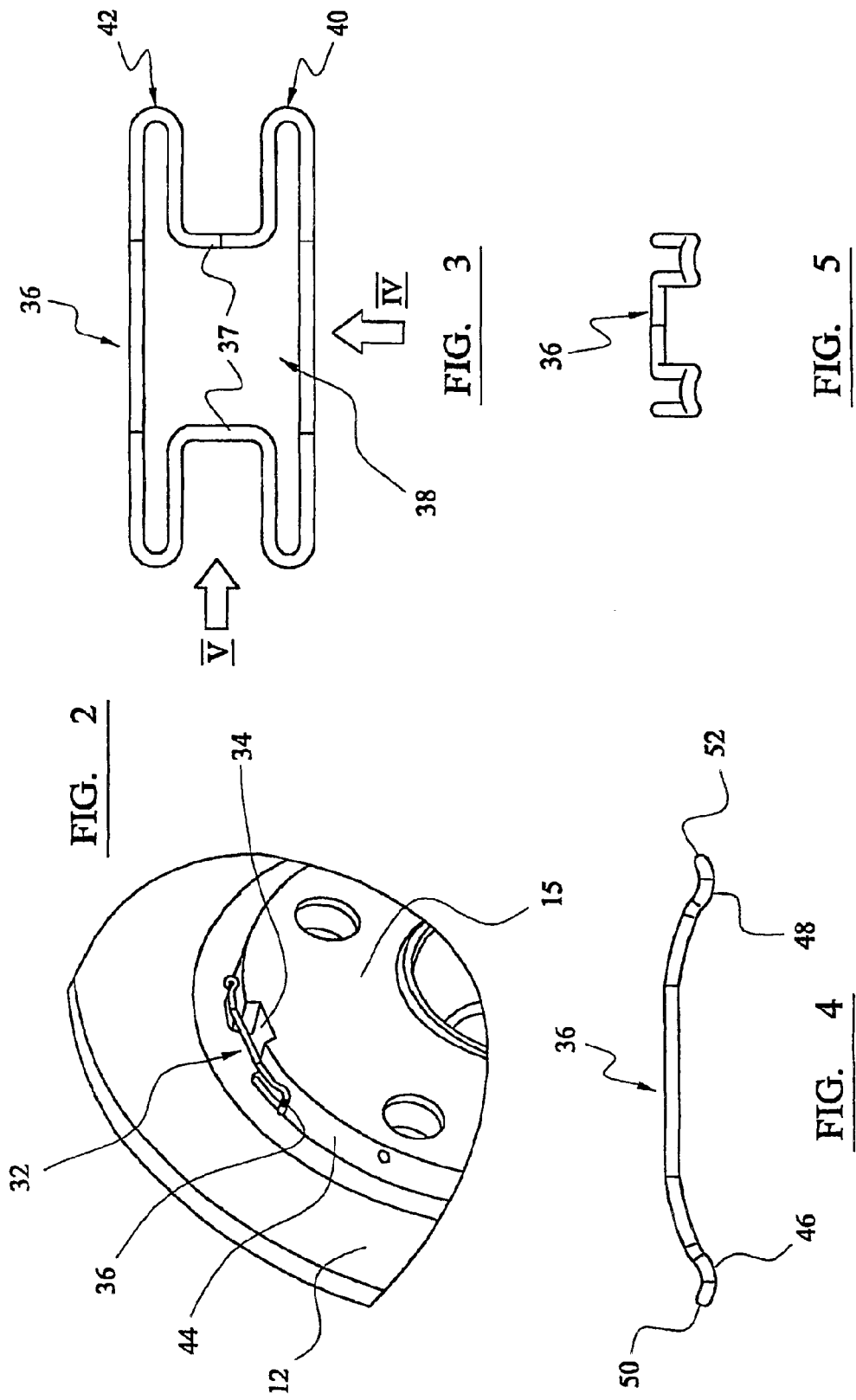

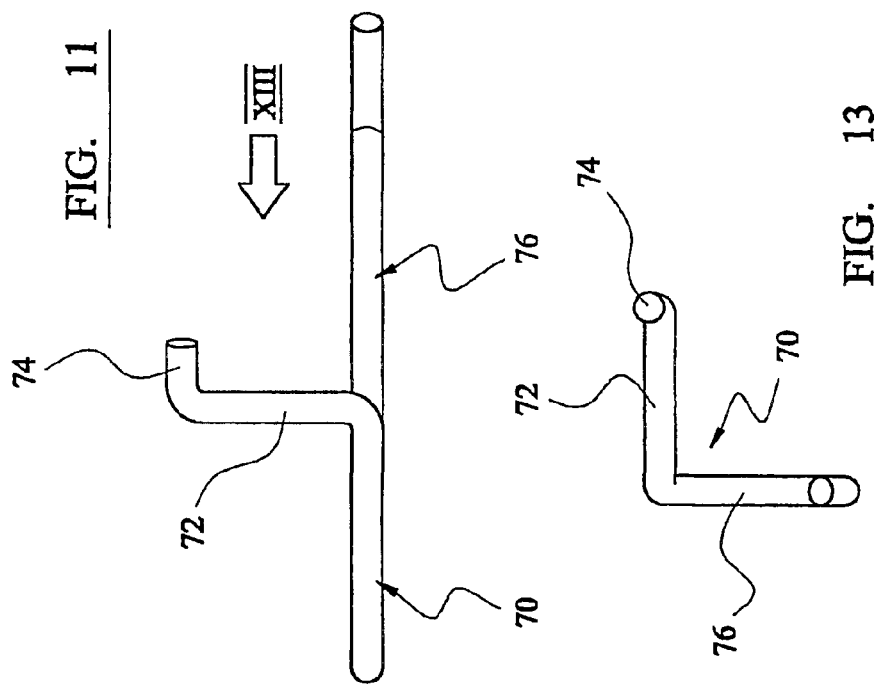
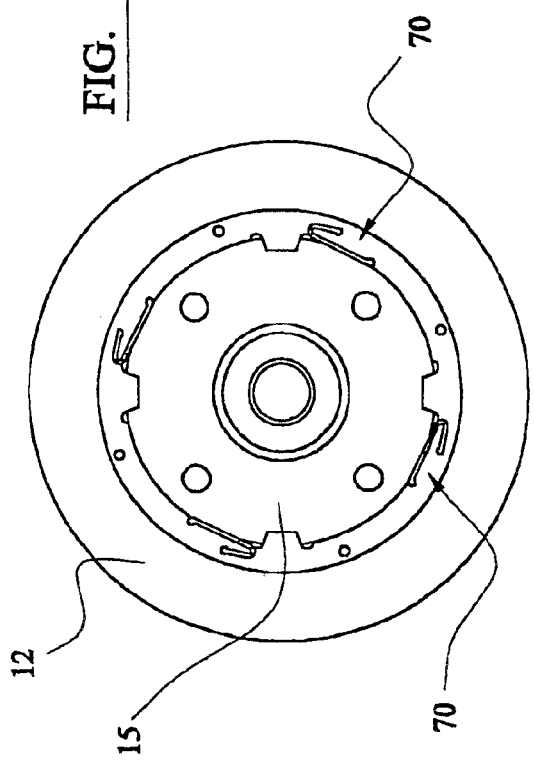
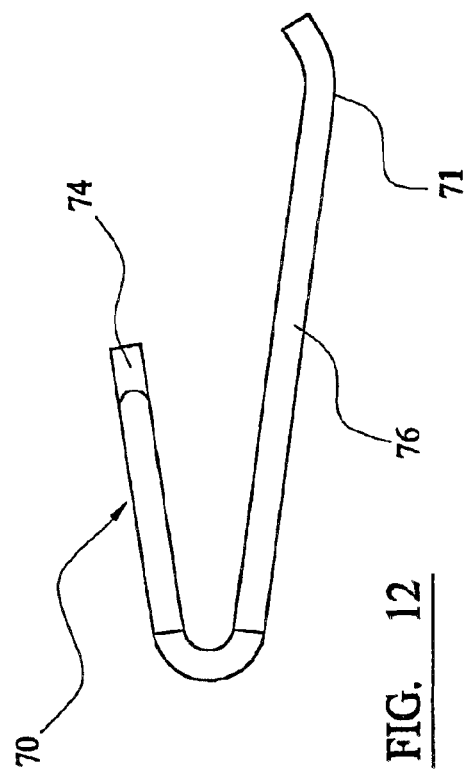

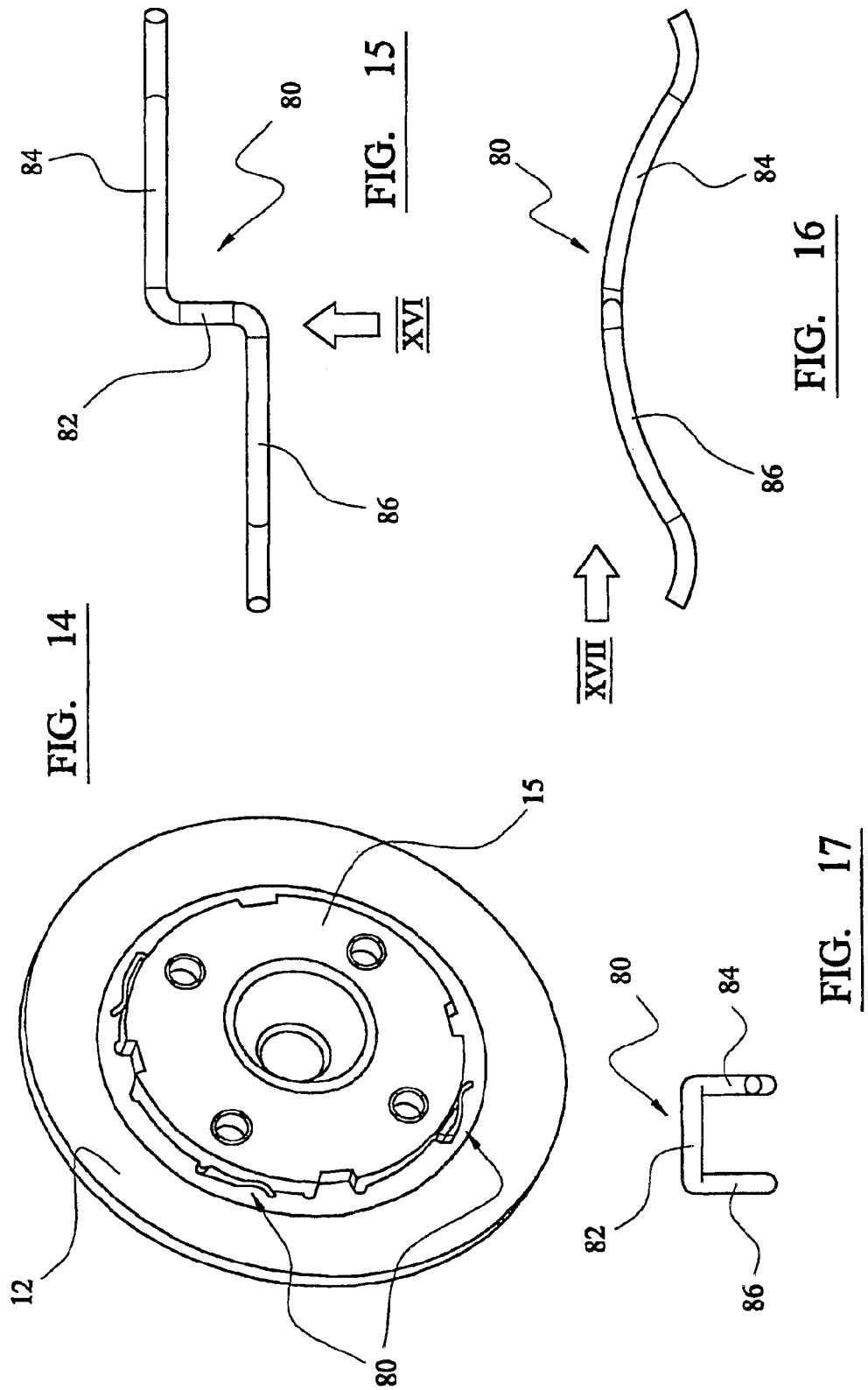

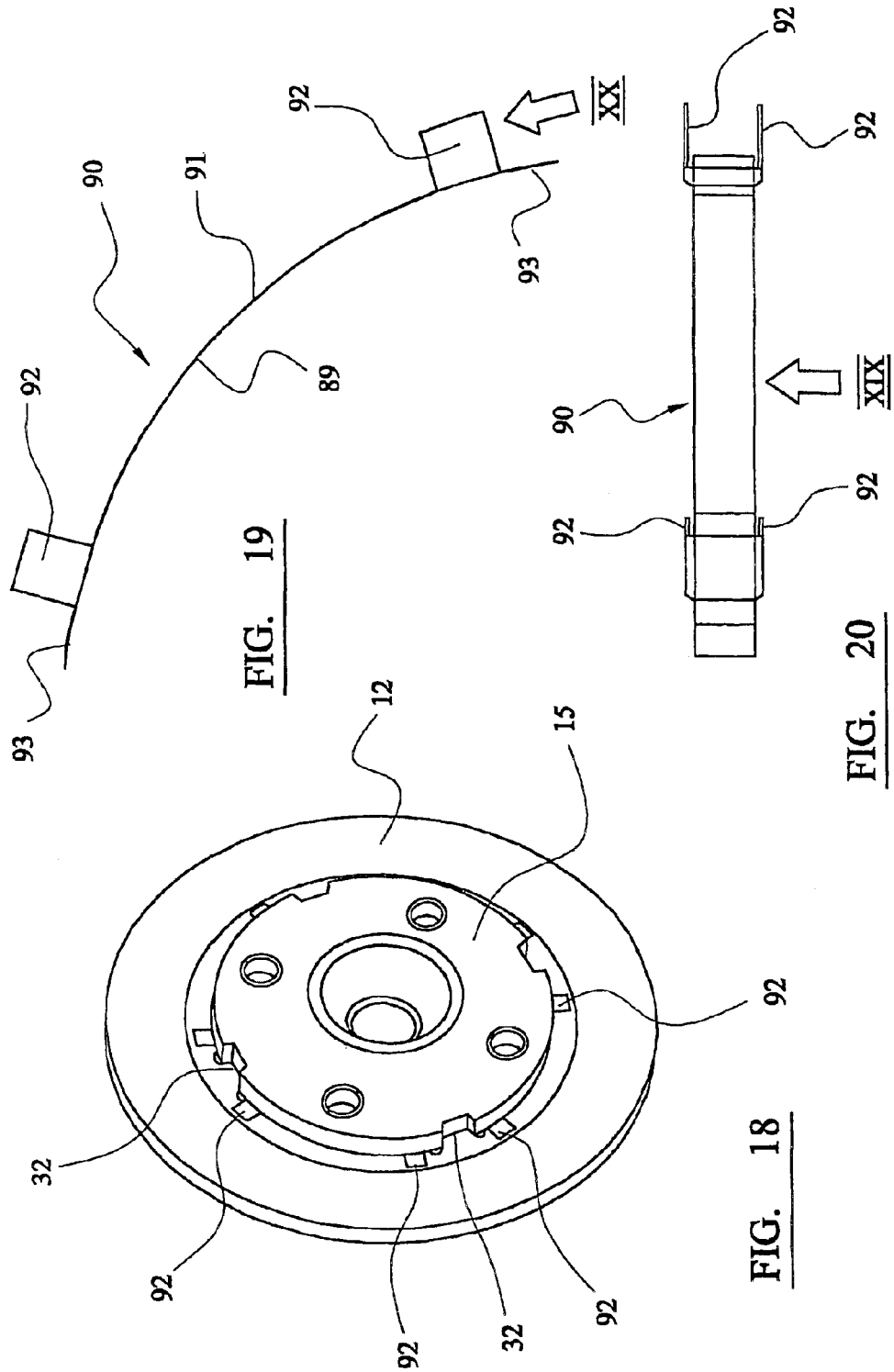

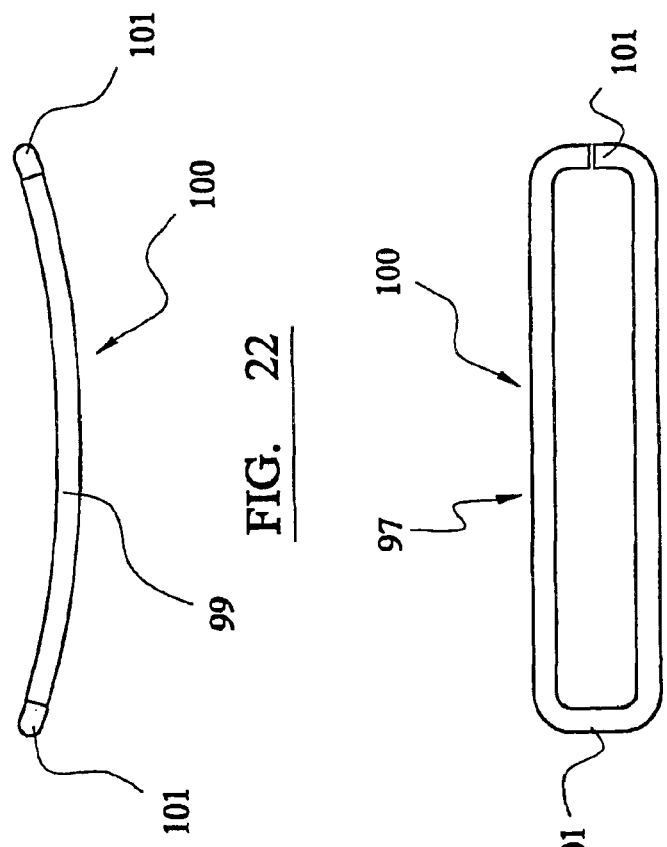
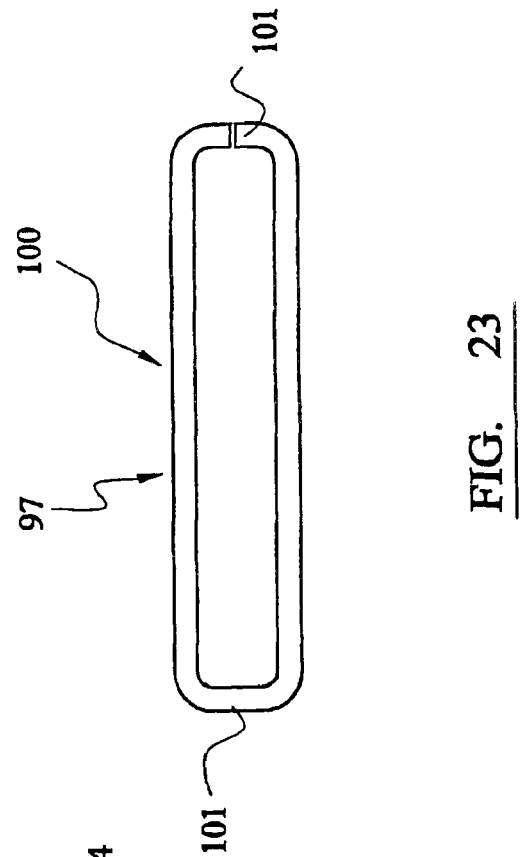
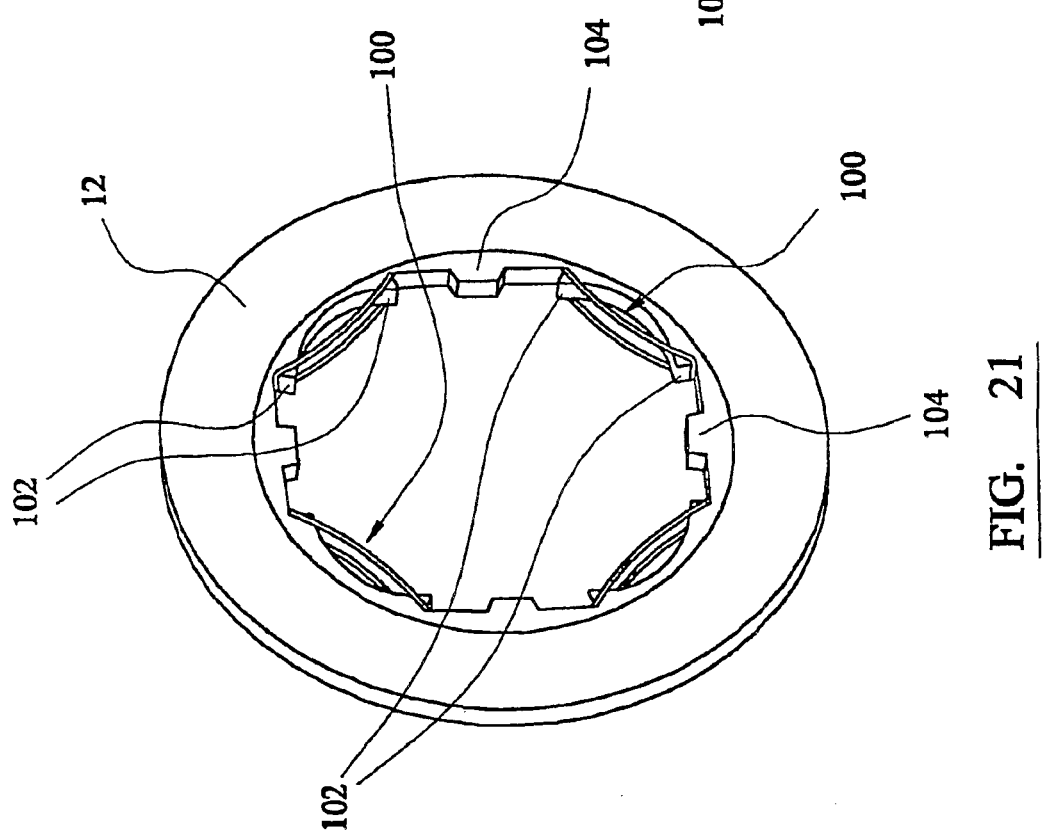
FIG. 22
FIG. 23
FIG. 21

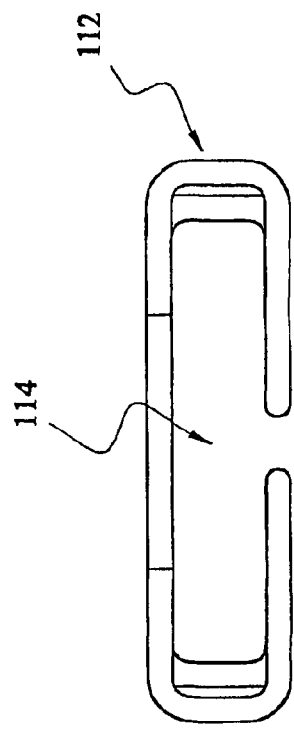
FIG. 25
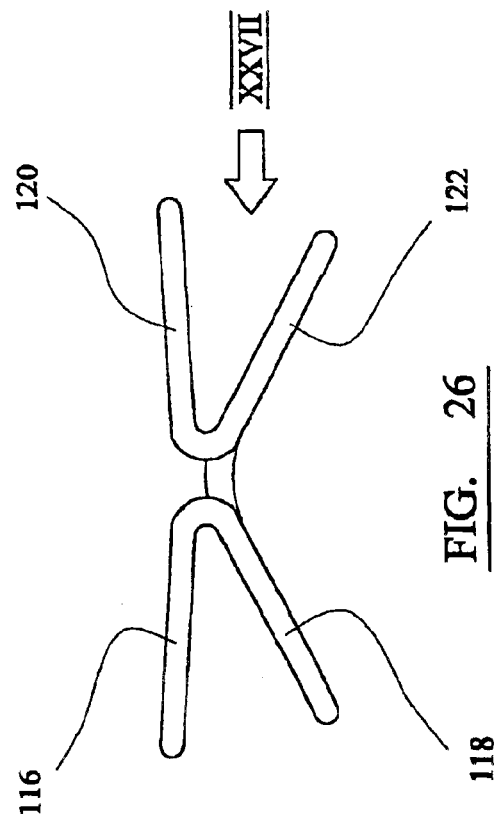
FIG. 26
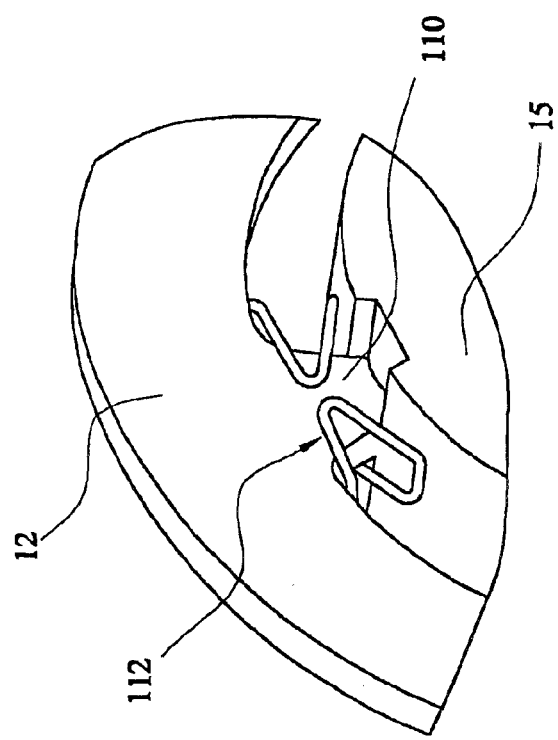
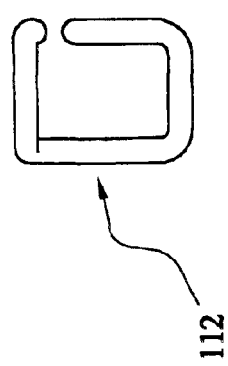
FIG. 24
FIG. 27

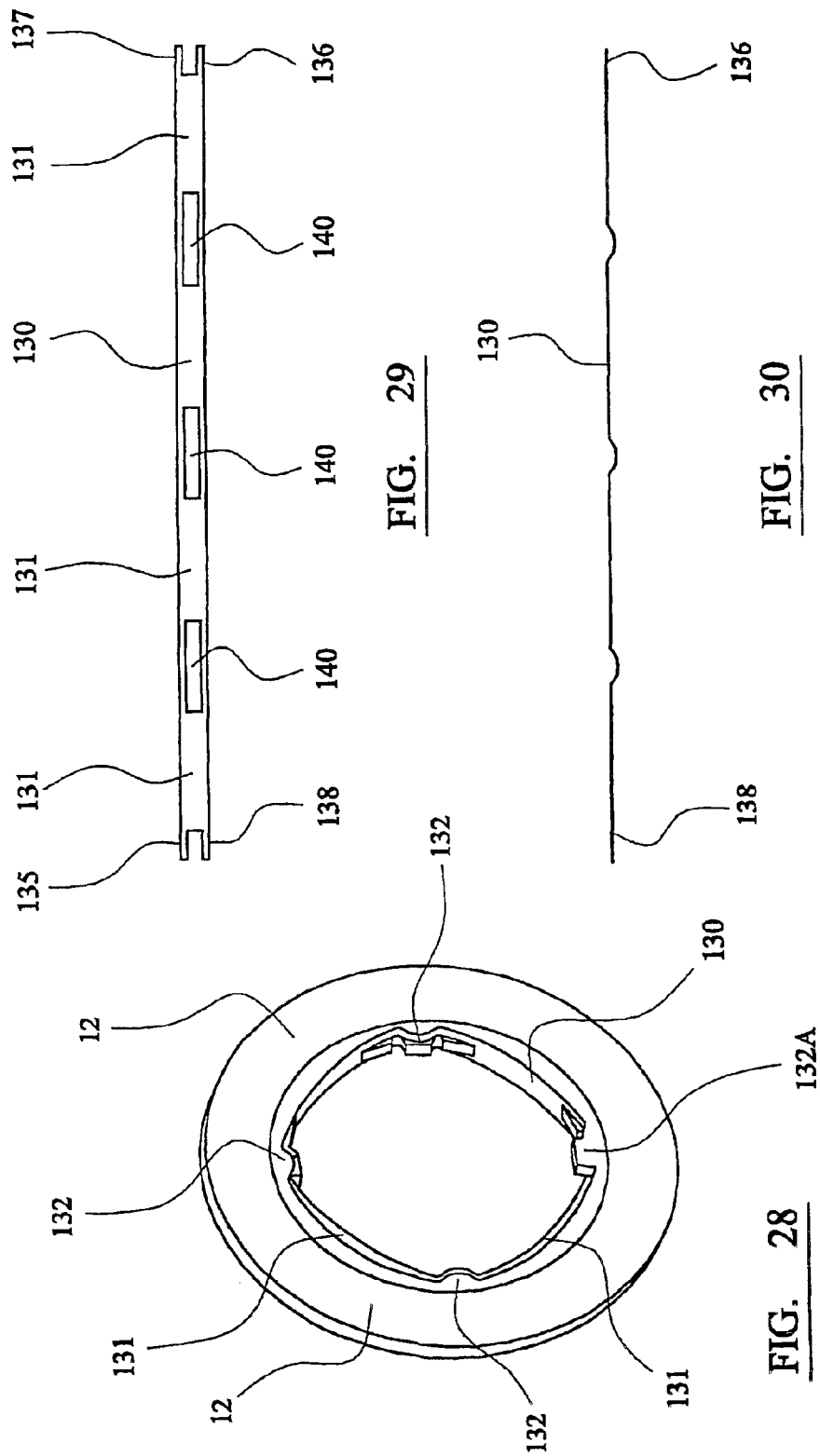

METHOD AND APPARATUS FOR MOUNTING A BRAKE DISC WITH RESILIENT BIASING MEANS

BACKGROUND OF THE INVENTION

1. Technical Field

This invention relates to a method and apparatus for mounting a brake disc in a disc brake. A particular application of the invention is to a spot-type automotive disc brake in which at least one, and preferably two brake discs are mounted for axial movement in use with respect to a central drive hub which drives the discs and on which they exert a braking effect during use. Typically, the central drive hub is a wheel mounting of an automobile. Certain aspects of the invention may find application outside the confines of spot-type automotive disc brakes.

2. Related Art

We have established that spot-type single or multi-disc disc brakes of the kind comprising axially movable discs can provide significant advantages over conventional spot-type automotive disc brakes. These advantages are set out in a series of patent applications which we have filed covering various aspects of the constructional differences between such brakes and conventional automotive disc brakes.

One aspect of these constructional differences relates to the use of resilient means acting between the one or more brake discs and the rotatable mounting therefor, such resilient means being provided to control certain aspects of the dynamics or movement of the brake discs during use. Reference is made to the disclosure in WO 98/26192 for a representative prior disclosure in this regard, and likewise too WO 98/25804. This latter disclosure concerns a disc brake system in which a plurality of leaf springs mounted on a hub and engaging the brake disc apply radially-directed forces between the disc and the hub.

However, we have discovered that the mode of mounting the resilient means with respect to the drive hub is of significance in relation to the effective operation of the resilient means for the brake as a whole, not to mention the resilient function itself.

As a matter of simple design principles, it is to be expected that the optimum arrangement would be as disclosed in our above-identified prior applications in which the resilient means is mounted on the hub and exerts its resilient or biasing effect on the disc by virtue of limited contact with the disc at certain well defined locations depending on the exact resilient means (or spring) design and the spring location.

Such an approach is consistent with the design principles emerging from the basic structure of the disc brake in which the relatively massive central hub provides a convenient reference base not only structurally for the mounting of the biasing springs, but also a relatively massive heat sink whereby a substantial thermal gradient exists in use between the brake disc with its locally-generated thermal energy and relatively low thermal capacity, whereby thermal factors favor minimizing the numbers of components to be subjected to frequent substantial thermal gradients, particularly components such as springs which are reliant upon thermally sensitive physical properties such as resilience.

SUMMARY OF THE INVENTION AND ADVANTAGES

However, we have discovered that despite the fact that the obviously apparent factors favor the adoption of the disc-mounting principles (with respect to resilient bias) disclosed in the prior art, there are significant and unexpected compensatory advantages in adopting the reverse approach wherein it is the disc itself which provides a mounting base for the resilient means (for example a series of circumferentially-spaced springs), whereby these can be considered as exerting a resilient bias which is directed from their mounting base on the disc to the rotatable disc-mounting hub, contrary to the teachings of the prior art.

In embodiments of the invention there are provided resilient means adapted to be mounted on the axially slideable brake disc in various ways and in various formats providing individual variations in ease of construction and mounting.

In one embodiment the individual resilient means straddle (either as a unitary construction or as to individual resilient elements) a series of projecting drive keys constructed to slideably cooperate with a series of complementary keyways formed in the rotatable mounting hub for the brake disc. This arrangement provides simplicity of achieving equi-spaced and likewise-balanced application of the resilient bias, without the need for cap screws or similar (potentially liable to corrosion) mounting means.

The location of the spring or other resilient means with respect to the disc is achieved in the embodiments by use of a spring configuration which is adapted to cooperate with the structure of the disc. For example, where a wire-format spring is adopted, then it becomes feasible for a structure to be adopted for that spring in which the spring is self-locating with respect to the external profile of the disc and passing from one side of the disc to the other as necessary for location and loading purposes. Where a leaf-spring format is adopted, it becomes feasible for the spring to adopt the use of a pair of gripping flanges adapted to engage on opposite sides of a relevant portion of the disc.

Where a wire-format spring is adopted, a related advantage achieved is with respect to the self-cleaning ability of the brake disc and mounting hub assembly, with respect to which the adoption of a wire spring format provides significantly enhanced ability to allow the escape of particulate and other detritus and other foreign matter whether wet or dry.

A further practical advantage arising from the mounting of the resilient means on the brake disc or discs relates to the dynamics of the axially slideable mounting of the brake disc or discs with the respect to the drive hub or mounting means therefor. We have discovered that one result of the mounting of the resilient means on the hub itself in prior proposals is that appreciable variations in the spring force arise from disc movement itself and from the adoption of two or more discs mounted in face-to-face relationship on the same hub or mounting.

By adopting the concept of mounting the resilient means on the disc or discs themselves an independence of spring effect is achieved since for each spring its interaction with the disc is constant at all times and the axial sliding movement of the disc relative to the hub has negligible effect on the spring interaction with this latter structure since the resilient means slides axially with the disc. Where two or more discs are employed, the spring effect for each is achieved by an identical spring assembly, or a suitably proportioned spring assembly, in order to achieve an identical net spring effect.

In the embodiments of the present invention the disc brake incorporates resilient means both in relation to the mounting of the brake discs on their mounting hub and in relation to the brake friction elements or pads in relation to their fixed mounting or caliper.

The resilient means are of a structure and strength chosen to be capable of, both in the case of the brake discs and in the case of the brake friction elements, maintaining these components of the brake assembly in their required working attitudes with respect to the structures on which they are mounted. In other words, the springs or resilient means for the brake discs are constructed so as to hold the brake discs in non-tilted working attitudes as they rotate. Likewise, the resilient means for the friction elements or pads maintain these latter structures in their required attitudes with respect to their fixed mounting or caliper. In both cases, the resilient nature of the resilient means permits, under the dynamic conditions arising during use of the vehicle and due to engine vibration and vehicle motion/road surface induced vibration and similar factors, a degree of movement from the defined working position (as opposed to the linear axial sliding movement needed to effect friction element-to-disc engagement and disengagement when commencing and terminating braking) which is needed under normal conditions of vehicle use.

In this regard, it is to be noted that the resilient means or springs used in the embodiments in relation to the friction elements for maintaining same in their normal non-tilted attitudes, differ significantly from the springs disclosed in the above-identified WO 98/25804 and WO 98/26192 specifications in which the pad springs are mere anti-rattle springs not adapted to hold the brake pads against tilting movement, but merely to avoid rattling.

Moreover, in the embodiments of the present invention the springs for the discs and for the pads are balanced in terms of their relative loading applied to the discs and the pads in order to achieve the necessary separation of same when braking is discontinued and yet holding the pads and discs against tilting during use. Thus, the spring forces exerted on the pads or friction elements of the present invention are much stronger than those needed merely to prevent rattling or noise suppression. The spring forces are sufficient to restrain the slideable brake pads or friction elements from moving into contact with the brake discs in an uncontrolled manner. The use of the substantially stronger pad springs in the present embodiments assists in positioning the outer rims of the brake discs in their brake-off position for reducing residual braking torque.

THE DRAWINGS

These and other features and advantages of the present invention will become more readily appreciated when considered in connection with the following detailed description and appended drawings, wherein:

FIG. 1 shows a diagrammatic representation of the thermal and related mass aspects and dynamic aspects of a spot-type disc brake having resilient means adapted to act between a relatively massive hub and a pair of axially slideable brake discs;

FIGS. 2, 3, 4 and 5 show a first embodiment of the invention, namely a perspective view of a portion of a brake disc and hub assembly with associated resilient means acting therebetween, and a plan view and a side elevation and an end elevation view respectively of the closed loop format wire spring which constitutes the resilient means, the directions of viewing of the spring being indicated by viewing arrows IV and V in the usual way;

FIGS. 10, 11, 12 and 13 show related views of a third embodiment of the invention, showing the assembly, and three views of a wire-format spring forming resilient means therefor which is adapted to be mounted on the brake disc by cooperation of a wire end formation with a corresponding structure of the disc;

FIGS. 14, 15, 16 and 17 show a modification of the embodiment of FIGS. 10–13 in which the spring is adapted to straddle the disc at the inner periphery of the latter while cooperating with the associated hub;

FIGS. 18, 19 and 20 show a leaf spring embodiment, being an assembly view of the disc and hub and spring assembly, and a side elevation view of the spring, and another view of the spring;

FIGS. 21, 22 and 23 show another wire-spring format embodiment, FIG. 21 showing the disc and springs in assembly and FIGS. 22 and 23 showing side elevation and plan views of the springs respectively;

FIGS. 24, 25, 26 and 27 show a further wire-spring format embodiment in which the spring straddles an inwardly-directed drive formation on the disc; and FIGS. 28, 29 and 30 show a further leaf-spring-format embodiment, FIG. 28 showing the disc and spring in assembly and FIGS. 29 and 30 showing plan and side elevation views of the spring respectively.

DETAILED DESCRIPTION

Figure 1:
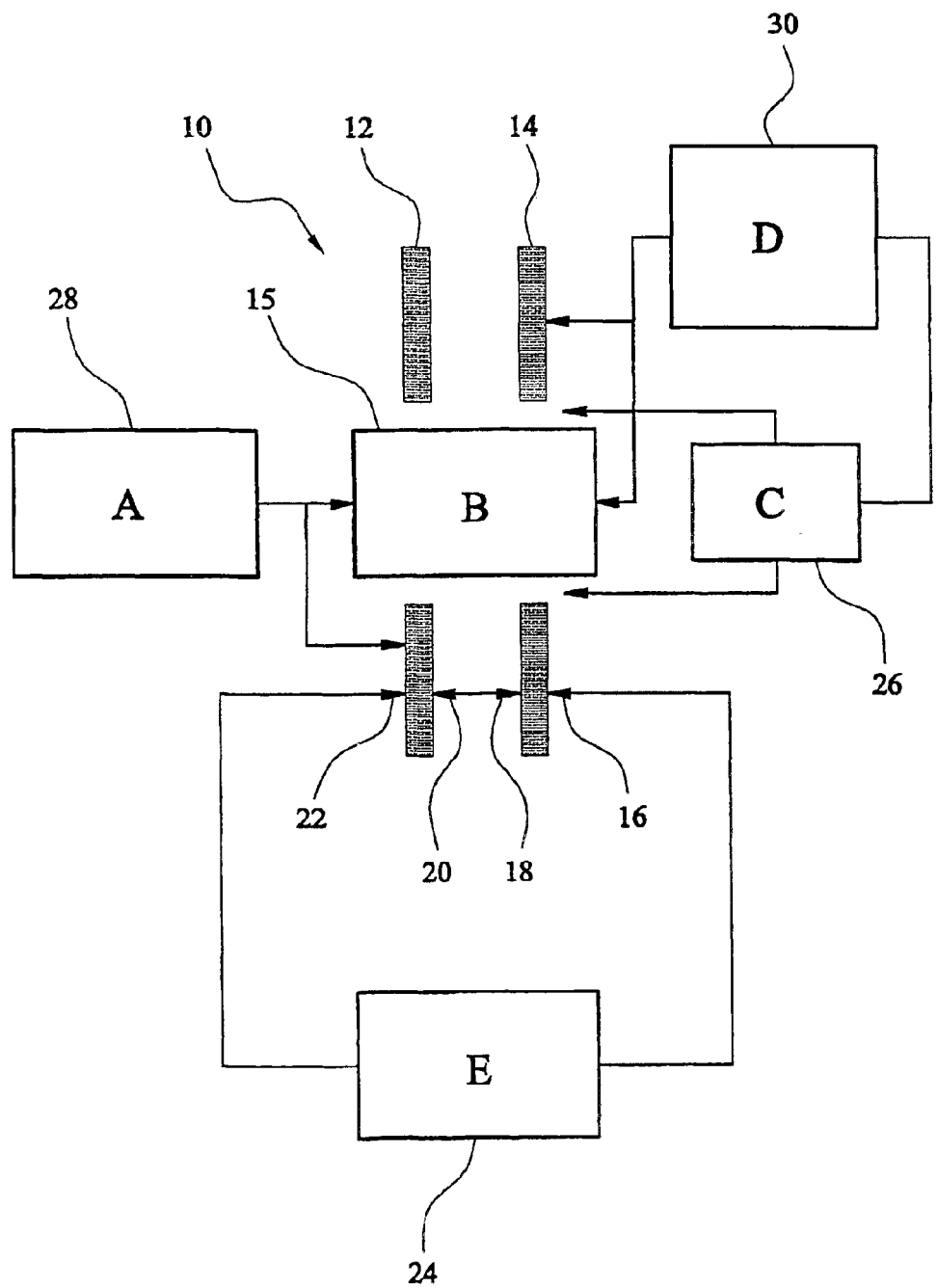
Figure 7:
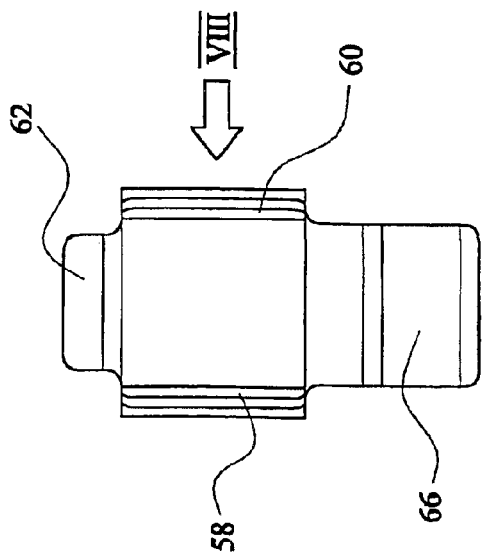
FIGS. 6, 7, 8 and 9 show a second embodiment of the invention in views corresponding somewhat to those of FIGS. 2–5 being a side elevation view of the assembly, a plan view of a leaf spring forming one of two resilient means, a side elevation view of same and an elevation view respectively.
Figure 9:
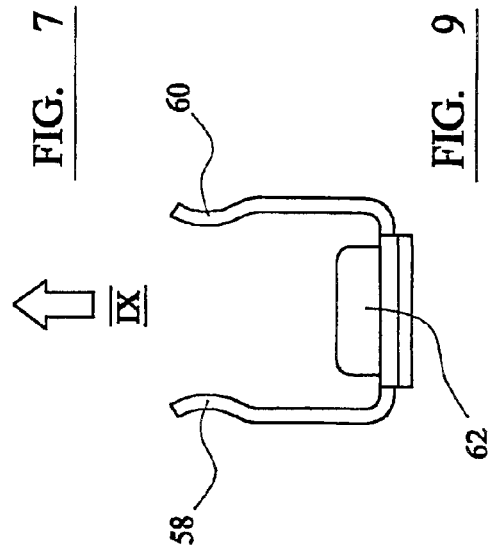

In FIG. 1 the thermal and related mass aspects, which will be referred to and described more fully below, are indicated by references A–E in which:

A refers to the Thermal Differential;

B refers to the Relatively Massive Hub;

C refers to the Spring Effect;

D refers to the Uniform Control of Dynamics; and

E refers to the Localized Spot-Type Brake Effect.

As shown in FIG. 1 a spot-type automotive disc brake system 10 comprises rotatable brake discs 12, 14, a rotatable mounting or hub 15 for the discs 12, 14 to permit such rotation and which is adapted to drive the brake discs and to have exerted thereon a braking effect by the brake discs when disc brake 10 is actuated.

Two pairs of friction elements indicated at 16, 18 and 20, 22 are adapted to frictionally engage braking surfaces on opposite sides of brake discs 12, 14 to effect braking on actuation of actuation means 24 therefor. Brake discs 12, 14 are axially slideable in use with respect to mounting hub 15 therefor under the action of friction elements 16, 18 and 20, 22 and actuation means 24 during braking.

Resilient device or means 26 is provided at circumferentially-spaced positions around brake discs 12, 14 and is adapted to act between the brake discs and mounting therefor at said positions. The mounting of the resilient means 26 with respect to the brake disc 12, and on same, is such that the resilient means slides axially with the disc.

Also shown in FIG. 1 at 28 is an indication of the thermal differential which exists between rotatable mounting or hub 15, which has a relatively massive construction, and the brake discs 12, 14 at which actuation means 24 causes a localized spot-type braking effect.

Likewise shown in FIG. 1 at 30 is the uniform control of dynamics D (in relation to axial movement of the brake discs 12, 14), which is a desideratum in relation to the function of resilient means 26 acting between hub 15 and brake discs 12, 14, as discussed above. In other words, and in particular in the case of brakes including multiple discs, it is desirable for the axial movement of the individual discs to be controlled in a uniform manner with the springs providing a uniform effect over the operating range of movement.

Turning now to the embodiments of FIGS. 2–27, these will be described with reference to the general structure shown in FIG. 1 in which the rotatable mounting or hub 15 and one of the axially slideable brake discs 12 is shown in each of the seven embodiments as part of an assembly which may comprise one, two or more discs and an associated hub, as shown diagrammatically in FIG. 1. It is to be understood that the purely diagrammatic representation shown in FIG. 1 is intended to be simply a convenient reference base for the technically competent person, for purposes of description, detailed structures being shown in the remaining figures.

In the embodiments of FIGS. 2–27, the resilient means which is provided at circumferentially-spaced positions around the brake discs and which is adapted to act between the brake disc 12 and the mounting for the brake disc 12 at those positions itself comprises mounting means for the resilient means (in the form of a spring or springs) which is adapted to mount the resilient means at these circumferentially-spaced positions on the brake disc or discs, so that when the resilient means is so mounted it applies a resilient bias directed from the mounting of the resilient means on the disc to the rotatable mounting or hub on which the disc is mounted. The resilient bias, or force acting between the disc 12 and hub is provided and generated by virtue of the resilience of the resilient means and deformation or bending of the resilient means. As will be understood by the person skilled in the art, deformation or bending of resilient means induces stress, for example torsional stress in the case where the resilient means are twisted, this induced stress in the resilient means generating forces acting in the opposite direction to the deformation or bending and tending to counter the deformation or bending.

The seven embodiments described below differ in the details whereby the resilient means is mounted on the disc.

As shown in FIG. 2, disc 12 is mounted on hub 15 by means of a series of inwardly projecting keys or drive formations 32 of inwardly tapering format which enter correspondingly-profiled keyways 34 or grooves formed in the hub. In this embodiment, the resilient means 26 is constituted by a wire spring 36 of generally endless loop format and having two inwardly-directed portions defining a waist 38 adapted to fit around key 32 so that the lateral side portions 40, 42 of the spring can act on the outwardly-facing surface 44 of hub 15 at each side of the disc. The portions 37 of the spring 36 within the waist 38 bear against the disc 12 so that the spring 36 provides a force between the disc 12 and the hub 15. For this purpose, the side portions 40, 42 have smoothly-curved contact profiles 46, 48 with upturned ends 50, 52.

As shown in FIG. 4, spring 36 has (inside elevation) a generally convex profile between its upturned ends 50, 52 whereby, by virtue of its wire spring construction, it exerts the required resilient effect between disc 12 and hub 15.

In this embodiment, four keys and corresponding springs are provided per disc. Each spring is retained by its respective key.

Figure 6:
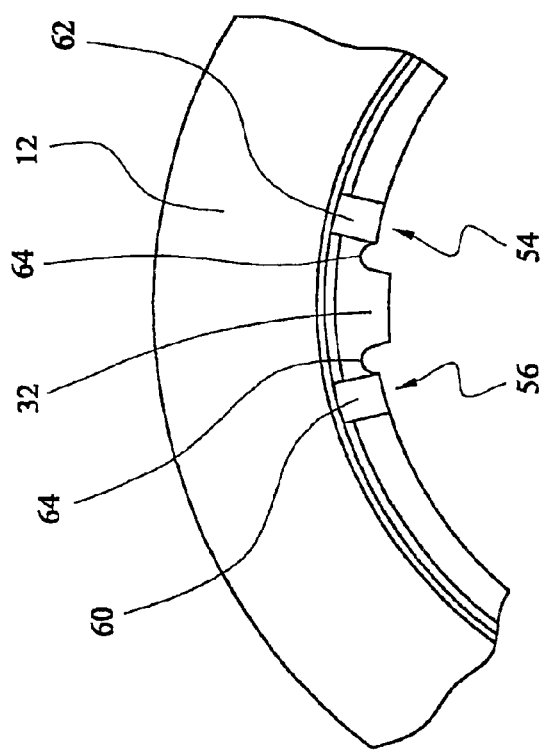
Figure 8:
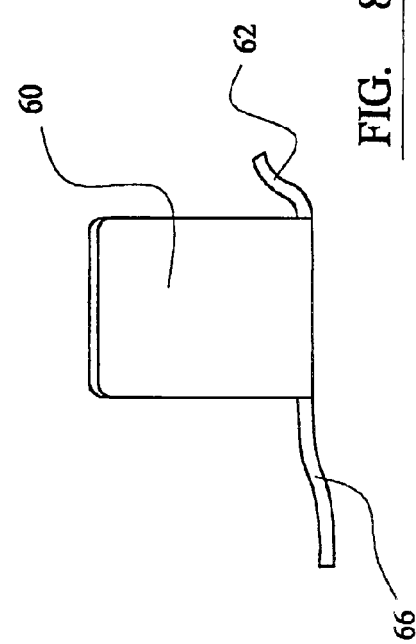

Turning to the embodiment of FIGS. 6–9, in this embodiment the resilient means 26 is provided by a pair of leaf springs 54, 56, for each key 32 on brake disc 12. The leaf springs each comprise a pair of resilient flanges 58, 60 adapted to grip the disc on opposite sides thereof and a profiled location flange 62 adapted to cooperate with the profile of a curved recess 64, at each end of key 32, and further comprising a leaf spring end portion 66 to exert the resilient force on hub 15. The location flange 62 bears against the disc 12 whilst the leaf spring end portion 66 bears against the hub 15. As shown in FIG. 6, two such leaf springs 54, 56 are provided one at each side of key 32 of disc 12.

Turning now to the embodiment of FIGS. 10–13, in this embodiment the spring 70 of the resilient means is of wire-spring format and comprises a portion 72 extending between opposite sides of the disc 12 and having an end portion 74 at one side which engages structure at one side of the disc and a hairpin-form spring format 76 at the other side of the disc for engagement with hub 15. The portion 72 extending between opposite sides of the disc abuts against and engages the disc 12 whilst the curved profiled portion 71 of the hairpin portion 76 bears against the hub 15.

As previously, four such springs are provided per disc, with the hairpin spring portions 76 disposed alternately at opposite sides of the disc.

In the embodiment of FIGS. 14–17, the wire spring 80 likewise has a portion 82 extending between opposite sides of the disc, and spring end portions 84, 86 of generally linear format in plan view and convex format in side elevation view. The end portions 84, 86 provide spring force application on hub 15 at opposite sides of the disc 12 whilst the spring is constrained by portion 82 which abuts against and engages the disc 12.

In this embodiment four springs are provided per disc, although only three can be seen in FIG. 14.

In the embodiment of FIGS. 18–20, a leaf spring 90 has a leaf portion 91 is of generally arcuate format (see FIG. 19) and comprises resilient flanges 92 to grip the disc 12 at opposite sides thereof. The profile of leaf portion 91 in the unloaded condition, is linear, whereby the loading of the spring to the curved profile shown in FIG. 19 produces the requisite spring force. When installed, the end portions 93 of the spring 90 abut and bear against the inner periphery of the disc whilst the central portion 89 of the spring 90 bears against the outer peripheral surface of the hub 15. The spring 90 is also constrained and held in the arcuate shape by the abutment of the end portions 93 with the keys 32 of the disc.

In the embodiment of FIGS. 21–23, a loop-format wire spring 100 is of generally bowed side elevation profile when installed on the disc 12 as shown in FIG. 22 and located between mounting formations 102 so as to have the arcuate profile shown in FIG. 21 for resilient engagement with hub 15. The spring 100 initially has a generally linear flat natural shape and is deformed and flexed into its bowed side elevation profile when installed on the disc. This bowing of the spring produces the requisite spring force. It will be appreciated though that an initially bowed spring 100 could be used which is then further bowed when installed. Disc 12 has a special profile at its inner edge, incorporating mounting formations 102 and keys 104. The mounting formations 102 comprise grooves in the disc 12 within which the ends 101 of the springs 100 are engaged, thereby constraining the spring 100. A central portion 99 of the spring 100 abuts against an outer peripheral surface of the hub 15.

In the embodiment of FIGS. 24–27, disc 12 has extended keys 110 around which a generally X-format (in side elevation) wire spring 112 is straddle-mounted so that as the key enters an opening 114 (see FIG. 25) defined by double loops 116,118 and 120,122, the X-format structure of the spring 112 provides the resilient effect acting between the disc 12 and the hub 15, as clearly shown in FIG. 24.

In the embodiment of FIGS. 28–30 the disc 12 has keys 132 which engage in keyways in the hub 15. The resilient means comprises a strip of spring steel 130. The strip 130 in its uninstalled, unloaded condition is generally linear as shown in FIGS. 28–30. The strip includes a number of apertures 140 within it and at each end 136,138 there are recesses or notches 135. In the installed loaded condition of the strip 130 it is bent and mounted within the disc 12 with the apertures 140 fitting over and straddling the keys 132 of the disc. The end of the strip 130 abut against one 132A of the keys 132 with the notches 135,137 engaging on either side of that key. The three apertures 140 are equally spaced so as to receive the three other keys 132 of disc 12 and the portions of strip 130 therebetween extend in use, in a generally chordal direction relative to the disc inner periphery and provide the resilient effect acting between the disc 12 and the hub 15 (not shown) which is mounted within the disc. It will be appreciated that the outer periphery of hub 15 abuts against the portions 131 of strip 130 between apertures 140.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A disc brake system comprising: an axially movable brake disc supported on a rotatable mounting hub; a plurality of resilient devices adapted to act between said brake disc and said rotatable mounting hub at circumferentially equi-spaced positions around said brake disc, said resilient device being symmetrically mounted on said brake disc for axial movement with said brake disc independent of said mounting hub and to apply a centering and anti-tilt resilient bias force directed from said brake disc to said rotatable mounting hub.

2. The brake disc system of claim 1 wherein said brake disc includes drive keys engaging associated drive keyways of said rotatable mounting hub, said resilient device straddling said drive keys of said brake disc.

3. The disc brake system of claim 1 wherein said resilient device comprises at least one leaf spring having resilient flanges engaging said brake disc.

4. The disc brake system of claim 1 wherein said spring device comprises at least one spring disposed under stress between said brake disc and said rotatable mounting hub to exert said resilient bias force therebetween.

5. A disc brake system as set forth in claim 4 wherein said resilient device comprises a strip defining a plurality of apertures with each aperture straddling a drive key.

6. A disc brake system as set forth in claim 5 wherein each strip extending chordally relative to said brake disc.

7. A disc brake system comprising:

a rotatable mounting hub;

at least one brake disc slideable on said hub and having opposite sides and braking surfaces on said opposite sides;

at least one pair of friction elements operative when actuated to frictionally engage said braking surfaces of said at least one brake disc to effect braking action of said at least one brake disc and said rotatable mounting hub; and a plurality of resilient devices attached at circumferentially spaced locations to said at least one brake disc and movable axially with said at least one brake disc relative to and independent of said rotatable mounting hub, said resilient devices acting between said at least one brake disc and said rotatable mounting hub to apply a resilient bias force directed from said at least one brake disc to said rotatable mounting hub for centering said brake disc;

wherein each resilient device comprises a spring wire.

8. A disc brake system as set forth in claim 7 wherein said spring wire defines an endless loop having two inwardly-directed portions defining a waist acting upon the brake disc and around the associated drive key of the brake disc and lateral side portions acting upon the rotatable mounting hub.

9. A disc brake system as set forth in claim 8 wherein said side portions define upturned ends presenting curved portion abutting said mounting hub.

10. A disc brake system as set forth in claim 7 wherein each wire spring includes an end portion engaging one side of said brake disc and a hairpin portion engaging the mounting hub on the other side of said brake disc.

11. A disc brake system as set forth in claim 10 including a central portion between said end and hairpin portions engaging said brake disc with said hairpin portion disposed to react between said mounting hub and said disc.

12. A disc brake system as set forth in claim 7 wherein said wire spring defines a loop having ends engaging said brake disc and bowed between said ends to engage said mounting hub.

13. A disc brake system as set forth in claim 7 wherein said wire spring defines four double loops defining an X-shape as viewed in side elevation with an opening therebetween surrounding a drive key.

14. A disc brake system as set forth in claim 13 wherein said X-shape includes upper arms abutting said brake disc and lower arms abutting said mounting hub.

* * * * *